US006963817B2

(12) United States Patent
Ito et al.

(10) Patent No.: US 6,963,817 B2
(45) Date of Patent: Nov. 8, 2005

(54) SYSTEMS FOR ACQUIRING DATA FROM A FACILITY AND METHOD

(75) Inventors: Toku Ito, Calgary (CA); Kevin Benterud, Sherwood Park (CA); Robert Do, Edmonton (CA); Andrew Jarman, Edmonton (CA)

(73) Assignee: zed.i solutions (Canada), inc., Edmonton (CA)

( * ) Notice: Subject to any disclaimer, the term of this patent is extended or adjusted under 35 U.S.C. 154(b) by 0 days.

(21) Appl. No.: 10/638,852

(22) Filed: Aug. 11, 2003

(65) Prior Publication Data

US 2004/0098218 A1 May 20, 2004

Related U.S. Application Data

(63) Continuation of application No. 09/482,415, filed on Jan. 13, 2000, now abandoned.

(51) Int. Cl.[7] .................. G01L 11/00; G01L 13/00; G01L 15/00; G01L 19/04
(52) U.S. Cl. .................. 702/138; 702/50; 702/98; 702/188
(58) Field of Search .................. 702/31, 33, 50, 702/51, 98, 113, 114, 122, 124, 126, 138, 702/140, 183, 188, 189; 340/855.1, 853.2, 340/456.3

(56) References Cited

U.S. PATENT DOCUMENTS

| | | | |
|---|---|---|---|
| 4,382,385 A | 5/1983 | Paros | |
| 4,531,193 A | 7/1985 | Yasuhara et al. | |
| 4,583,170 A | 4/1986 | Carlin et al. | |
| 4,850,227 A | 7/1989 | Luettgen et al. | |
| 5,325,312 A | * 6/1994 | Kidd | 702/51 |
| 5,606,513 A | 2/1997 | Louwagie et al. | |
| 5,680,899 A | 10/1997 | Waid et al. | |
| 5,790,977 A | 8/1998 | Ezekiel | |
| 5,873,049 A | 2/1999 | Bielak et al. | |
| 5,899,962 A | * 5/1999 | Louwagie et al. | 702/138 |

(Continued)

FOREIGN PATENT DOCUMENTS

| | | | |
|---|---|---|---|
| EP | 0019672 A1 | 12/1980 | |
| EP | 905939 A2 | * 3/1999 | H04L 1/00 |

OTHER PUBLICATIONS

Disclosure of U.S. Appl. No. 60/128,513.*
Disclosure of U.S. Appl. No. 60/129,708.*

*Primary Examiner*—Marc S. Hoff
*Assistant Examiner*—Manuel L Barbee
(74) *Attorney, Agent, or Firm*—Domingue & Waddell, PLC

(57) ABSTRACT

A field instrument and system for obtaining pressure, flow and temperature data from a facility. The field instrument includes an enclosure having an opening therein. An integrated analog sensor is sealingly contained within the opening. The field instrument further contains an external analog sensor. An analog to digital converter converts the analog signals to digital readings. An external digital sensor is also provided, with the digital output being communicated through a second opening within the enclosure. A control member that receives, stores and processes the digital readings is positioned within the enclosure. A communication module is included to transmit the digital readings to a remote computer. The communication module allows for two way communication between the field instrument and remote computer. The remote computer may be a server that allows for access by many users. The communication module also allows for locally accessing the digital readings via a serial port to a local terminal.

16 Claims, 11 Drawing Sheets

U.S. PATENT DOCUMENTS

| | | |
|---|---|---|
| 5,909,493 A | 6/1999 | Motoyama |
| 5,940,290 A | 8/1999 | Dixon |
| 5,975,737 A | 11/1999 | Crater et al. |
| 6,023,223 A | 2/2000 | Baxter, Jr. |
| 6,276,306 B1 | 8/2001 | Murphy et al. |
| 6,510,350 B1 * | 1/2003 | Steen et al. ............... 700/9 |

* cited by examiner

SYSTEMS FOR ACQUIRING DATA FROM A FACILITY AND METHOD

CROSS-REFERENCE TO RELATED APPLICATION

This application is a continuation of original application Ser. No. 9/482,415 filed 13 Jan. 2000 now abandoned.

BACKGROUND OF THE INVENTION

This invention relates to a system for obtaining pressure, flow and temperature data from a facility. More particularly, but not by way of limitation, the invention relates to an instrument and system that collects, processes and stores measurements of pressure, flow and temperature and relays data to many users.

In the production of oil and gas from subterranean reservoirs, operators have found it necessary to complete wells in many remote regions. In order to produce, transport and refine hydrocarbons, it is necessary to construct production facilities at these remote regions. Due to the hazardous nature of hydrocarbons, it is necessary to employ various safety features in all phases of the process to ensure against pollution, explosion, and other safety hazards.

Operators find it beneficial, if not necessary, to monitor pressure, temperature, flow rates, etc from these oil and gas facilities. The reasons for monitoring are numerous. For instance, the operator may wish to test the producing well in order to calculate bottom hole pressure, permeability, skin damage, etc. Additionally, the operator may simply wish to monitor the pressure within separators, pipelines and/or vessels to maintain proper working conditions. Regardless of the specific application, there is a need to accurately monitor conditions at the oil and gas facility in a timely manner.

Prior art devices have been designed to remotely communicate with oil and gas facilities. For instance, Supervisory Control And Data Acquisition (SCADA) systems have been developed to monitor and communicate with these remote areas. However, these SCADA systems suffer from a variety of deficiencies.

A significant deficiency is related to the inherent limitations of the Master-Slave communication protocol that is employed by SCADA systems. Further, prior art systems communicate from a limited number of oil and gas facilities to a single monitoring station which in turn relays information to a central control station. This architecture is necessary since the Master monitoring station must poll each Slave Field location individually to prevent communication collisions.

Another limitation in current practice is the accuracy of pressure measurement which is impaired by ambient temperature fluctuations. This accuracy limitation reduces the effectiveness in many process monitoring applications that depend on measurement stability, such as process simulation or process accounting.

A further limitation of current practice is the elaborate installation requirements that result from the physical size, number of components and complex interconnections that are needed to implement each field location with a remote measurement system.

Therefore, there is a need for a system and method that can capture, store and process accurate pressure, flow and temperature data, and communicate this data in a more flexible manner to a local computer and/or remote server. There is also a need for a system that will allow for users to access data from multiple remote locations on an as needed basis. Further, there is a need for a system that can alert remote users of predetermined alarm conditions in an efficient and timely manner. There is also a need in many practical applications for improved pressure measurement accuracy and stability compared to what is achieved using current practice. There is also a need for an instrument that can work in an oil and gas environment without fear of explosion. There is also a need for an instrument that integrates many of the measurement system components into a single, compact package to simplify installation. These, and many other needs, will be accomplished by the invention herein described.

SUMMARY OF THE INVENTION

A system for transmitting a pressure reading obtained from a process line is disclosed. The system comprises a small, explosion proof enclosure having a first opening with a first integrated analog pressure sensor therein which is connected to control means for receiving, processing and storing the digital pressure output reading. The control means is located within the enclosure. A second remote digital sensor is connected to the control means via a second opening within the enclosure. The system may further comprise means, positioned within the internal chamber, for transmitting the digital pressure output reading to a remote location. The system also contains serial communication means for transmitting the processed digital pressure output readings to a terminal located at the facility.

In one of the embodiments, the system includes database means, operatively associated with the transmitting means, for storing the digital readings with the database means including a data manager means for receiving, retrieving and communicating the digital readings. The system may further comprise a central server, located remotely from the facility, and wherein the central server is capable of receiving the data.

The system may further comprise user interface means, operatively associated with the database means, for allowing access to the data, and a user computer having means for accessing the user interface means.

The system further comprises a plurality of analog sensors producing an analog signal; an adapter connected to the analog sensor, with the adapter being sealingly received within a second opening in the enclosure; and means, electrically connected to the analog sensor, for converting the analog signals to digital readings.

In one of the embodiments, the transmitting means comprises a communications module means for transmitting the digital pressure output reading using a TCP/IP protocol to a central server via the Internet. The system may further include a user computer, and wherein the user computer has loaded thereon a web browser capable of reading the data and a communications link from the user computer to the Internet.

A process for collecting, transmitting and monitoring a pressure from a facility is also disclosed. The process comprises communicating the pressure to a tubular member and communicating the pressure from the tubular member to a pressure sensor. An enclosure is provided, with the enclosure having a first opening, a second opening, and an inner chamber, and wherein the pressure sensor is housed in the first opening.

The process includes sealing the first opening and the second opening so that the pressure is withheld from the inner chamber so that the pressure is precluded from entering or exiting the inner chamber. A digital pressure reading from the pressure sensor is collected and transferred to a control means for receiving, processing, and storing the digital pressure reading, and wherein the control means is located within the inner chamber. Next, the digital pressure reading in the storage means is transferred to a modem communications means for communicating digital data, and wherein the modem communications means is located within the inner chamber.

In one of the embodiments, the digital pressure reading is converted to a digital packet data in the modem communications means which in turn is transmitted via the modem communications means. The digital packet data is received at a remote data base engine where it is stored for later retrieval. The process may further comprise collecting an analog reading with an analog sensor, and wherein the analog sensor is sealingly housed within the second opening of the enclosure. The analog reading is converted to a digital reading and is transmitted to the control means.

In one of the embodiments, the data base engine contains a data manager and the method further comprises storing the digital pressure data and digital temperature data. Additionally, the database engine may further contain a central server interface and the process further comprises providing a central server communicated with the database engine via the central server interface and accessing the central server from a user computer. Next, the digital pressure reading is requested from the user computer and the digital pressure reading is transmitted to the central server which is ultimately transmitted to the user computer.

According to the teachings of the present invention, it is also possible for a user computer to have a direct link to the control means. The user computer could be located at the facility or at a remote facility. The process would comprise connecting with the control means from the user computer with the direct link, and transmitting the digital pressure reading to the user computer.

In another embodiment, the process includes polling the field instruments data and setting predetermined data limits. Once a predetermined limit is exceeded, this exception will be recorded, and an exception signal is produced. The exception signal is sent to the database. The exception signal is transmitted to the central server and then transmitted to the user computer.

The process may also include sending the digital pressure data to a web server and then sending the digital pressure data to the Internet wherein the digital pressure data may be accessed over the Internet with a web browser from a user computer.

In one of the preferred embodiments, the step of correcting the digital pressure data for ambient temperature effect corruption includes mapping the digital pressure data through iteration and back calculating to a high accuracy pressure reading.

A feature of the present system includes allowing for routine and unattended measurements, data logging and compression and data base generation locally and remotely. It is possible for long term process performance monitoring, on-board configurable process analysis (i.e. report when a process parameter reaches a certain value), and process monitoring and indication.

The operating system has incorporated therein orifice gas flow AGA 3 or AGA 8 calculations, process excursion reporting and time stamping (i.e. for peak demand billing), and warning generation and error logging (i.e. for process interlocks and diagnostics). The operating system performs sampling at rates fixed, programmed sequences, or are triggered and/or auto adjusting. The sampling rate may be based on a pressure set point (rise and fall), the rate of pressure change (rise and fall), the pressure differential (rise and fall), a temperature set point (rise and fall), and the rate of temperature change (rise and fall).

The sampling rate may also be based upon calculated parameters such as flow rate (i.e. high flow, high sample rate), rate of flow rate change (i.e. steady flow, low sample rate, erratic flow, high sample rate). It is possible to have a sample rate related to the state, the change of state, the period or the rate of a digital input signal. Another feature is the ability to perform dynamic and/or static source characterization that includes in-line testing for pipelines, pumping stations, tank farms, etc that need transfer function characterization as well as well testing. For instance, the instrument can be used with shut-in tools to develop "Pressure vs. Time" and "Pressure vs. Flow Rate" characteristic curves for reservoir analysis. The system can also be used for preventive maintenance reminders and system error detection and flagging.

Data transfer and alarm notification capability of this system is significantly more flexible than prior art devices because of the use of TCP/IP protocol. The system will also allow long term data logging and storing of this data. Perhaps most importantly, these instruments have high accuracy, high precision and high resolution of pressure data which is essential for proper management and optimization of oil and gas production and transport facilities.

With reference to external communications, the system allows for communications port management. Additionally, the wireless modem option allows for access to dedicated or local public phone systems or satellite access for very remote locations, which in turn allows access to the Internet or local intranet. The instrument data is in a standard format and the instrument uses standard communication protocols, and standard communications channels. The instrument can use either an integrated or remote antenna.

The system data management and data routing features may be configured in various ways. The simplest is a one-to-one relationship where data from one instrument is conveyed to a single user. Instrument and data access is managed by a single user. Second, it is possible to have data collected from many instruments collated and conveyed to a single user. Instrument and data access is managed by a single user. Third, data from many instruments is collected, collated, and conveyed to a variety of users. Instrument and data access and control privileges are managed by a localized or distributed process and may be different for different users.

An onsite user has a local display and indicators that include liquid crystal display (LCD) for presenting measurement results, error codes and message; a light emitting diode (LED) noting instrument status and a power LED. Manual input switches are included for master reset and system configuration. Also, the local terminal option allows for running local diagnostics, install firmware upgrades and possible local retrieval of process data.

Another instrument feature is that it is compact, relatively self contained, and highly integrated. The enclosure can be used in hazardous locations (it is explosion proof, and rated for Zone 1). The enclosure is physically rugged and environmentally sealed.

Applications include fluid or gas metering, typically in remote processing facilities or pipelines. The field instruments are comparatively low cost and easy to install. Few changes are required to existing facilities.

The system can monitor pressure and flow rate when the instruments are combined with orifice plates. The operating system can instruct the instrument to sample data at rates of up to once per second to enable high temporal resolution flow calculations to be performed. The instrument is suitable for custody transfer applications, point-of-use metering, and transmission pipeline leak checking. The instrument normally acts in a remote data dump mode to periodically deliver logged flow data and flow statistics to a user's database via a wireless digital modem. If required, the instrument can switch into an alarm mode to proactively signal that a process variable or state is out of specification or it can be periodically interrogated to read process conditions. The location of the device may be the well head, pipeline monitoring station etc. Generally, communication will be over a wireless communication channel provided either by a terrestrial cellular service or a digital satellite link. The novel instrument can be used in remote and/or unattended settings or when accurate collection and time stamping of flow rate and totalized volume is required.

The system has multiple uses. For instance, the system can be used on oil and gas platforms, pipeline and pipeline facilities. The system can be used to monitor water production and water table levels. The novel systems can be used for custody transfers, or for monitoring storage and distribution facilities, chemical processing facilities, bulk transfer facilities (trucks, ships, rail cars, etc.) Additionally, the field instruments may be used on point of use systems and utilities including water and sewer.

DETAILED DESCRIPTION OF THE PREFERRED EMBODIMENTS

Figure 1:
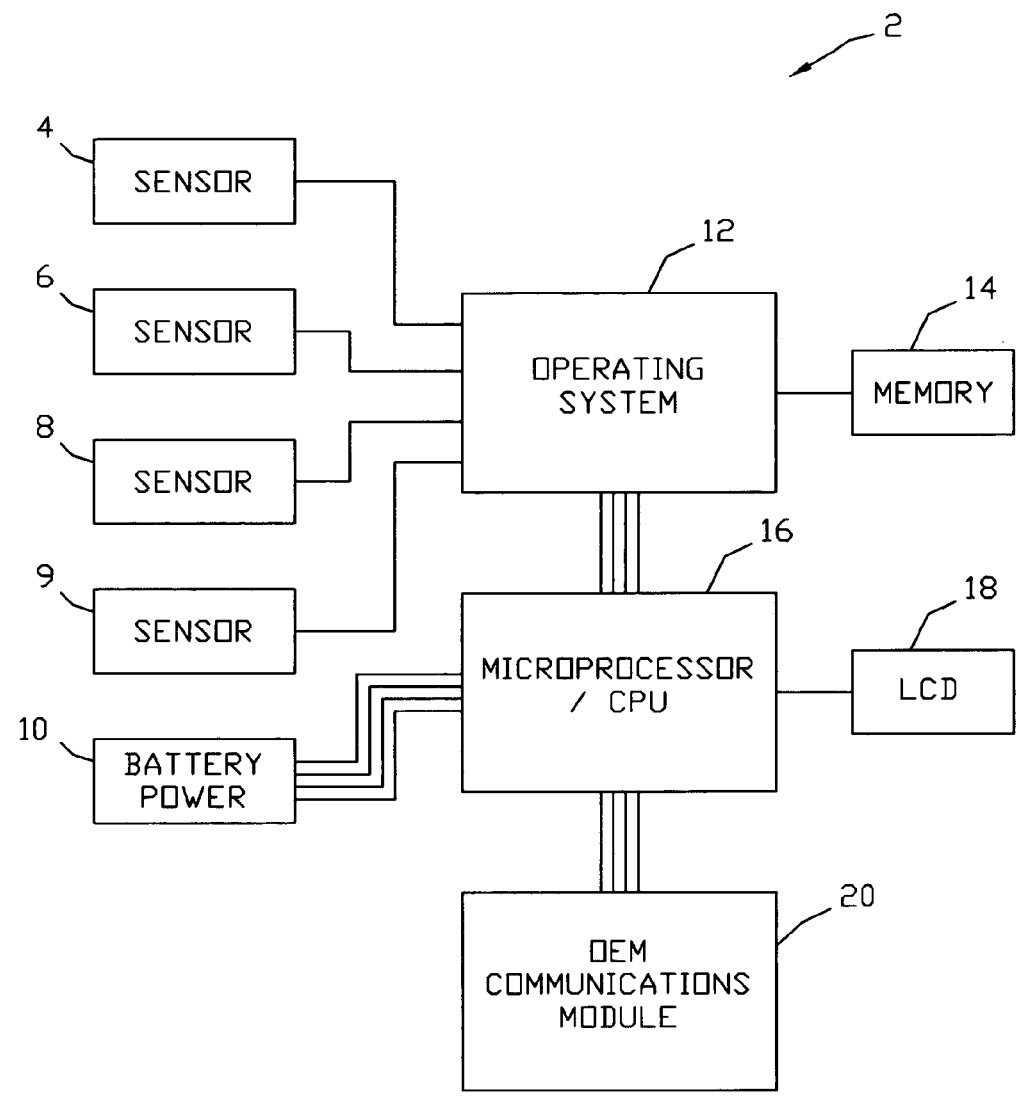
FIG. 1 is a schematic flow chart of the basic components of the surface data system.

Referring now to FIG. 1, a schematic flow chart depicting the basic components of the field instrument 2 (FI) of the present invention will now be described. The FI 2 is a very high accuracy pressure instrument designed specifically for use in the oil and gas industry. In the embodiment shown, two analog pressure sensors 4, 6 will be included within the enclosure.

The sensor core is a high accuracy, silicon crystal, strain gauge which has been laser welded into a high pressure autoclave fitting adapter, which in turn is threaded into one of the housing ports located on the enclosure. This sub-assembly is rated for pressures up to 12,000 psi, and has an over-pressure rating of 1.3. Suitable pressure sensors 4, 6 are commercially available from Z. I. Probes, Inc. located in Canada under the mark # 14095140 Pressure Sensor.

An auxiliary analog sensor port is included in the enclosure to attach to a low accuracy external resistive based sensor 8, such as a temperature probe. Temperature probes are commercially available from Omega, Inc. under the name PR-12 Type. The FI 2 may also incorporate an auxiliary digital sensor port 9 so that the device may attach to communicate to a number of external digital sensors over a RS-485 signaled bus. On this bus, the FI 2 will poll external digital sensors using various protocols (i.e. Modbus). The enclosure of the FI 2 is explosion proof, and will be C.S.A./UL certified for operation in Zone 1 (Class 1, Div 1, Group C, D, etc) hazardous locations. The actual enclosure will be described later in the application.

In the preferred embodiment, the FI 2 is self-powered by an internal battery pack 10, even though the teachings of the present invention include use of a possible external power source. A rechargeable battery may be used. The rechargeable pack may be replenished by connecting a solar panel or with an externally powered charger as is understood by those of ordinary skill in the art.

Readings are acquired on a preprogrammed time interval via a custom operating system 12 and stored internally in non-volatile memory 14. Between readings, the electronics and sensors are powered off to conserve energy via a preprogrammed routine in the operating system 12. The custom operating system utilizes a Real Time Clock (RTC). This RTC powers up the system at the preprogrammed time and then interrupts the main processor 16 in preparation for acquiring each new reading. Once the electronics have been initialized, the processor 16 will acquire readings from each of the internal sensors 4, 6 and external sensors 8, 9 connected to it, and store these readings in non-volatile memory 12. The operating system 12, memory 14 and micro-processor 16 are referred to as the control means for receiving, processing and storing the data.

Once the readings are processed, they will be optionally displayed on a small LCD 18 that can be viewed through a window in the explosion proof enclosure as will be described in greater detail later in the application. Alongside the LCD 18 there are also several small switches on the circuit board (not shown) to start an existing program, to reset the processor 16, and to manually configure the FI.

As will be detailed later in the application, the FI 2 can be utilized to measure a variety of process points. For instance, the system can be used for the following: to measure a single pressure and single temperature; to measure two pressures and a temperature; to measure orifice gas flow (which would require measuring a differential pressure) and a temperature. This list is illustrative.

In one of the embodiments disclosed, the FI 2 can be used in the well-testing market. Thus, the invention allows for the monitoring of a pressure build-up test. A line communicating a pressure from any specific well can be communicated with the pressure sensor 4 which will allow for the recording and transmission of data. The FI 2 can be installed onto a well head or pipeline for a short term test or for a long term test. The readings thus collected may be stored in the non-volatile memory 14 or communicated by one of the other described communication means.

One of the advantages of the present system is the multitude of different operation modes. One mode would allow the readings to be downloaded to an on-site computer after a test, such as a standard laptop computer where they are viewed and a report is generated. This mode of operation is termed "Memory" only.

According to the teachings of the present invention, the FI 2 has also been designed with an internal wireless communications module 20. In the preferred embodiment, the communications module 20 is commercially available from Sierra Wireless Inc. under the mark SB300. Field units with the communications module 20 require external power of about 3 Watts, which will recharge the battery 10.

Once installed on the test site, the SDS 2 will be self-contained and may be left for long periods at that location. In the mode of operation utilizing the wireless communications module, the FI 2 can relay process information on demand from the host server, on a regular schedule or by exception reporting (i.e. exceeding an alarm threshold which will be described later in the application). Once the raw readings of the sensors 4, 6, 8, 9 are acquired, these readings are converted to process values. This is done using an algorithm and a calibration (CAL) file.

The module 20 that has been packaged into the FI 2 is a low power device that allows computer to computer communication by four means, namely: (1) land-line phone; (2) circuit switched cellular channel (i.e. it works on first generation analog cell phone channel); (3) cellular digital packet data (CDPD); and, (4) satellite (i.e. data may be transmitted by utilizing low power satellite communications). These four standard means of communication allow the FI 2 to be located wherever there is adequate cell phone coverage or a land line connection.

In one of the embodiments, the operating system 12 in conjunction with the communications module 20 will allow the FI system to utilize the Transmission Control Protocol/ Internet Protocol (TCP/IP) for all communications with the network architecture for all operations including, but not limited to, well testing and monitoring applications.

TCP/IP is a major communication protocol standard. TCP/IP is actually two separate communications of protocols working in conjunction. An entire family of related protocols is covered in the TCP/IP heading, with TCP and IP as the two main protocols. TCP is partly responsible for breaking data down into packets, as well as reassembling them. The IP part handles how the data packets are transmitted over the network. By using TCP/IP, different computers running in different operating systems can communicate with one another if they all obey this protocol.

As those of ordinary skill in the art will appreciate, the field level Supervisory Control And Data Acquisition (SCADA) systems use a master-slave based communications protocol (e.g. Modbus). In most field monitoring situations, the remote office computer is typically the Master and the field unit is the Slave. This inherently determines how data flows from the field unit back to the office because the Slave can only transfer information to the Host when it is polled. This means that a field unit cannot initiate a notice to the central office when it has an alarm condition.

Using the TCP/IP protocol removes this Master-Slave relationship and allows information to flow asynchronously between the field unit and the central office. This novel system includes the following advantages over the prior art: first, the field unit can notify the central office whenever there is an exception or alarm condition without waiting for the host to poll for it; second, packet based transmission over the wireless network removes the possibility where the field unit radio may malfunction and jam the transmission link for all other units in the line of sight area; third, FI units may be activated to take simultaneous readings on an array of sites. This list was meant to be illustrative.

Figure 2:
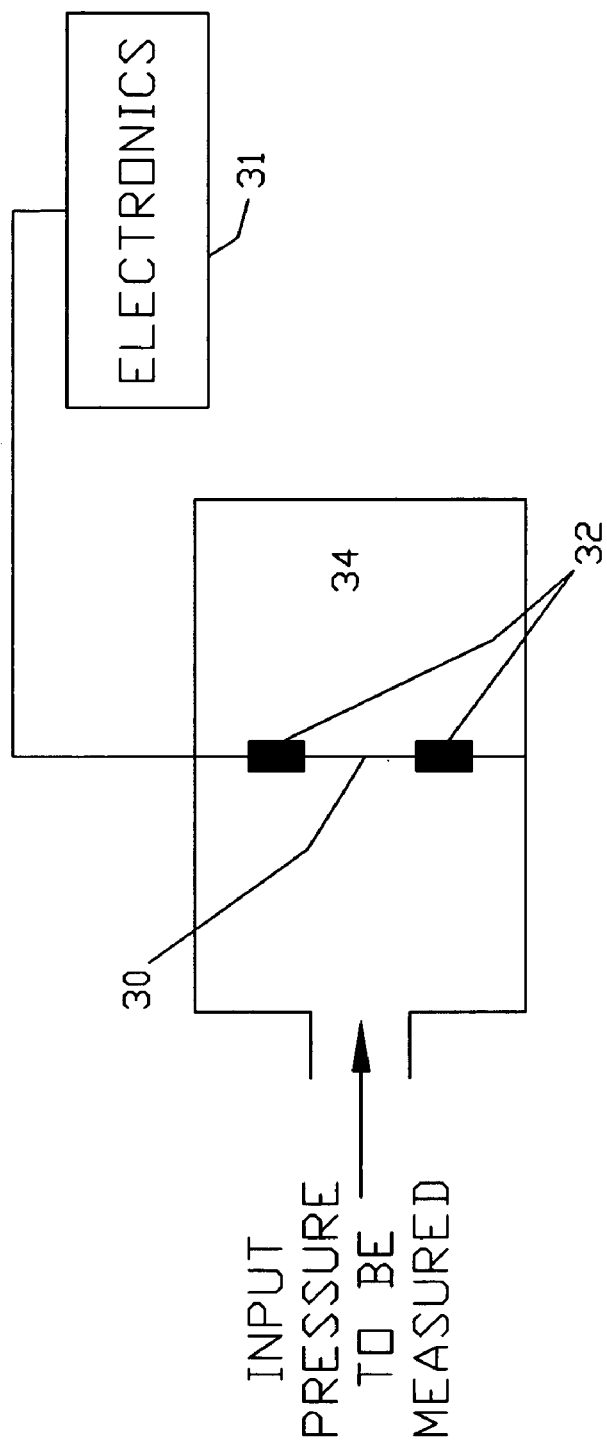
FIG. 2 is a cross-sectional view of a pressure data probe embodiment.

Referring now to FIG. 2, a schematic illustration of a basic pressure sensor 4 will now be discussed. It should be noted that like numbers in the various figures refer to like components. Generally, semiconductor pressure transducers are commercially available from companies such as National Semiconductor, Motorola, and Honeywell. The pressure sensor 4 of the preferred embodiment has been modified by applying a temperature correction factor algorithm into the operating system, with the pressure sensor 4 of the preferred embodiment being commercially available from Z. I. Probes, Inc., as mentioned earlier.

In one of the embodiments, the sensor 4 consist generally of a flexible silicon diaphragm 30 with resistive bridge sensors 32 mounted on the surface. One side of the diaphragm faces a sealed chamber 34 while the other side is made open to an input pressure. Deflection of the diaphragm in turn causes the resistive sensors to produce a signal as is well known in the art. All of the necessary electronic circuitry 31 including the bridge circuit, excitation, instrumentation amplifiers, and other compensation and conditioning circuitry is included.

Figure 3:
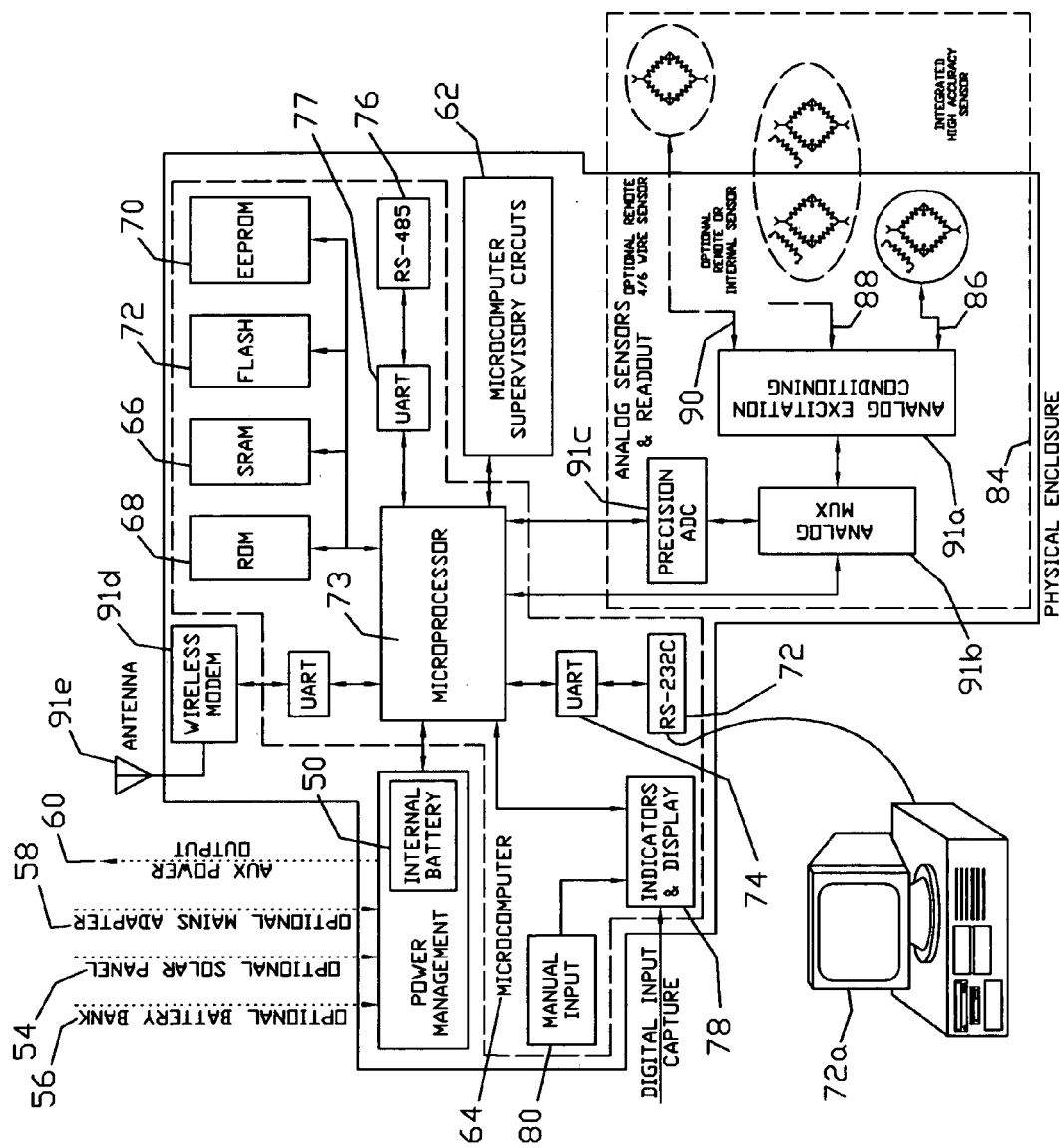
FIG. 3 is a schematic diagram of the hardware configuration of the preferred embodiment.

FIG. 3, which is a schematic diagram of the hardware configuration of the preferred embodiment, will now be described. The power management means 50 includes an internal rechargeable cell 52, which in the preferred embodiment is a Li based rechargeable battery. This battery 52 is suitable for an ambient temperature range of −20 degrees C. to +50 degrees C. Some of the features of the power management means 50 will also include battery protection circuits (not shown) which allows for low voltage shut down which protects the battery from deep discharge degradation effects. Also included will be a high voltage clamp that protects the battery from overcharge. Also included in the power management means 50 are circuits for battery cycling and conditioning that ensure that the batteries do not remain at peak charge voltage for extended periods. Smart charger technology is also included that is configurable to allow changes for new battery technology.

As seen in FIG. 3, the hardware configuration also includes external power options. An optional solar panel connection 54 may be included. The design also allows for an optional battery bank 56 to be electrically connected to the power management module. Additionally, a mains adapter 58 can be included, with an Universal AC mains converter to an intrinsically safe 12 VDC output. The hardware configuration includes an auxiliary power output 60 that is current limited, voltage limited, short circuit proof and ESD (electrostatic discharge) protected.

The hardware further comprises microcomputer supervisory function circuits, generally represented by the numeral 62. The circuits 62 contain a real time clock which is designed to produce interrupts to initiate samples. The circuits 62 also include micro central processing unit clocks that have features of full speed, reduced speed and halt. The circuits 62 further have a power supply monitor, watchdog timers, and system reset functions. The reset functions include resetting on power activation or power interruption, and resetting on certain recoverable system faults.

The microcomputer 64 includes memory storage means that contains the static random access memory 66, non-volatile read-only memory 68, electrically erasable read only memory 70, and flash cache memory 72. The memory means will be electrically connected to the microprocessor 73 for interaction as is well understood in the art. The SRAM 66 is commercially available from NEC Co. under the name/parts number UPD431000AGZ; the ROM 68 is commercially available from ATMEL Co. under the name AT29C020A; the EEPROM 70 is commercially available from ATMEL under the name AT28C256; and, the Flash memory 72 is commercially available from AMD under the name AM29F032B. The microprocessor 73 is commercially available from INTEL Co. under the name SB80C188EC13.

A local RS-232C 72 serial port is incorporated into the design that allows for terminal connection detection, port configuration and instrument configuration via a local terminal such as a laptop computer 72a. A universal asychonrous receiver-transmitter (UART) 74 that has a port configuration and means for hardware handshaking is electrically connected to the RS-232C. The UART is commercially available from EXAR Co. under the name XR15C850CM.

An RS-485 serial port 76 is incorporated that has port settings, hardware handshaking means, and provisions for access to smart sensors and process devices. The RS-485 port allows electrical connection to smart devices such as the digital sensors previously described. The RS-485 port is also electrically connected to a UART 77 which in turn is electrically connected to the microprocessor 73.

Indicator and display means 78 are included which in the preferred embodiment may be a LCD. The LCD is suitable for graphics, digits, etc. to provide rudimentary process data display, setup guidance and error reporting. It is possible to use light emitting diodes which emit green, yellow, and red light for okay, warn, and fail indicators.

Manual input is possible via the manual input module 80 which can be push buttons [under cover] for master reset, simple set up, display configuration, etc. A digital input capture port 82 is included that can monitor signals for state, change of state, timing and counting applications using an external contact sensor.

An analog sensor and readout module is generally represented by numeral 84. The configuration shown has three analog sensor ports arranged as shown, namely 86, 88, 90. The integrated precision pressure port 86 will have one or two channels, contain temperature compensation means, conversion means for converting the signal to engineering units, contain 4/6 wire resistive excitation, and have the ability to measure absolute or differential pressures. An optional remote or internal sensor port 88 is included that has one 4/6 wire excitation sensor, the sensor being typically a moderately accurate process temperature or pressure sensor. An optional remote or external sensor port 90 may be included with one 6 wire excitation sensor being connected. The port 90 may be employed if the second internal port is not used.

The senor ports 86, 88, 90 are electrically connected to the Analog Excitation Conditioning Circuit 91a which in turn is electrically connected to the analog multiplexer 91b. The signal may be directed directly to the microprocessor 73, or as in the preferred embodiment, is directed to the Precision Analog to Digital Converter 91c. The Analog Multiplexer 91b is commercially available from MAXIM Co. under the name MAX4052A. The Precision ADC 91c is commercially available from BURR BROWN Co. under the name ADS1211E. The ADC 91c is electrically connected to the microprocessor 73 as shown in FIG. 3.

A minimum of one sensor of any type is needed for collection of data. As noted above, a maximum of three channels of analog sensors, two of which can be pressure (P) or differential pressure (dP) sensors may be included with this system. Thus, the integrated analog sensors via port 86 and 88 are a high accuracy, 6-wire measurements that allows the following combinations: P, dP, P+P, P+dP. The external analog sensor via port 88 or port 90 is of moderate accuracy and can be 4-wire, or 4–20 mA type that allows the following combinations: pressure (P), differential pressure (dP), resistive temperature detector (RTD), P+RTD, dP+RTD.

An external contact type of sensor, operatively associated with the digital input capture 82, detects state, change of state, or timing. A remote digital sensor 91 connected via the RS-485 port 76 may also be employed, with this type of sensor being commercially available from a wide variety of vendors.

A compact wireless modem 91d is included. The modem 91d has a UART compatible input and can use CDPD data exchange. The modem 91d has a low power RF output. In the preferred embodiment, the modem 91d is commercially available from Sierra Wireless, Inc. as previously noted. An antenna 91e is shown to transmit data.

According to the teachings of the present invention, one of the possible instrument configurations includes a connection to a hardwired land line telephone network. Additionally, wireless forms of communications may be used that include circuit switched cellular via a telephone modem; a digital terrestrial cellular means that is packet based; or, a digital satellite link means that is also packet based. Another option for the transfer of the data includes use of the RS-232C port 72 to a hand held terminal device or laptop computer.

Figure 4:
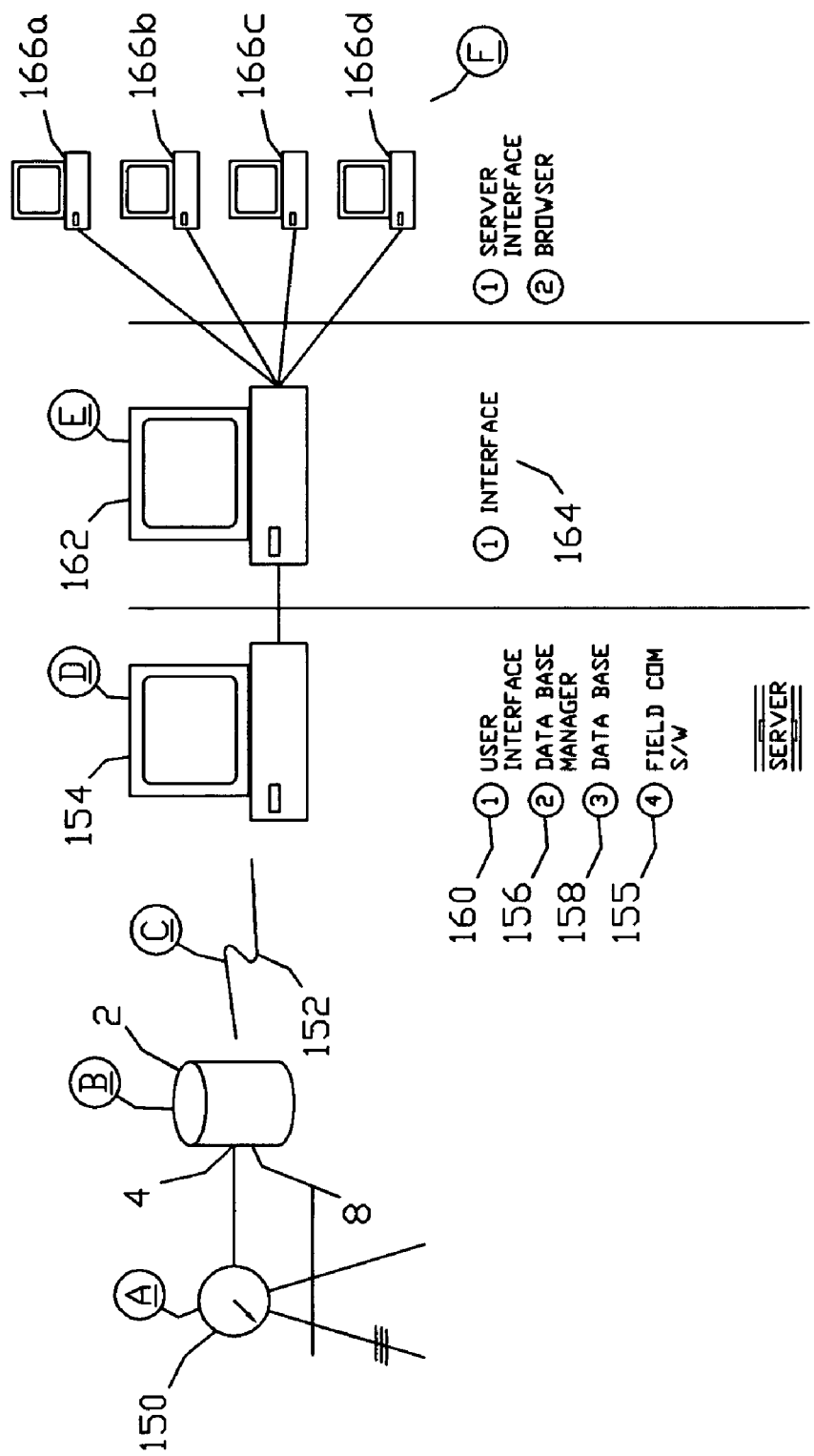
FIG. 4 is a schematic flow chart of a first systems architecture of the present invention.

Referring now to FIG. 4, a schematic flow chart of a first systems architecture of the present invention will now be described. A pressure from any source throughout the oil and gas facility 150 can be communicated to the FI 2. In the preferred embodiment, the pressure is communicated from an oil and gas well 151 completed to a hydrocarbon reservoir. The pressure may be communicated to the FI 2 from down hole, from the well head, from flow lines, from a separator, from a pipeline, process equipment, etc.

In FIG. 4, the pressure from a well completed to a subterranean reservoir has been communicated to the sensor 4 of the SDS 2. An analog temperature sensor 8 has also been included. The sensors 4, 8 will collect pressure and temperature data, for instance, and will then transmit that data to the operating system 12 for processing as previously discussed. The operating system will then transfer this data to the field communications module 20 which will be capable of transmitting the digital information as shown in FIG. 3 as numeral 152

The field communications module 20 will transmit the digital data to a database engine 154 which is commercially available from Oracle Inc. under the name Oracle 8i. The database engine 154 will have loaded thereon field communication software 155 to communicate with the communications module 20. The database engine 154 will consist of a data manager software 156 that is operatively associated with the database 158. In the software context, when it is mentioned that it is "operatively associated with", the phrase simply means that the two components can electronically exchange data between each other. The data base 158 will have a table configuration that will enable the storage of the various data that has been received. Also included will be a user interface module 160 that consist of software that will interface with the server 162 so that the server 162 and database engine 154 can communicate.

The information system's architecture also includes the interface 164 loaded on the server 162. This interface 164 may also be located at the third party's location, or loaded onto multiple user computers 166a, 166b, 166c, 166d. Also loaded onto the third party's computer 166a–166d will be the browser. Thus, at this third party location, the user may access the data base 158.

The database engine 154 may be located at the operator's own site. This allows for security of the data, and control by the operator. Alternatively, the database engine may be physically placed at a third site separate from the operator's site.

According to the teachings of the present invention, multiple FI units may be placed at multiple locations, with the individual FI unit having the field communications module wirelessly transmitting to the data base engine 154.

Thus, the database engine 154 will have numerous sensor information stored thereon, from multiple measurement points. Additionally, multiple users can access the database 158 from multiple locations.

Figure 5:
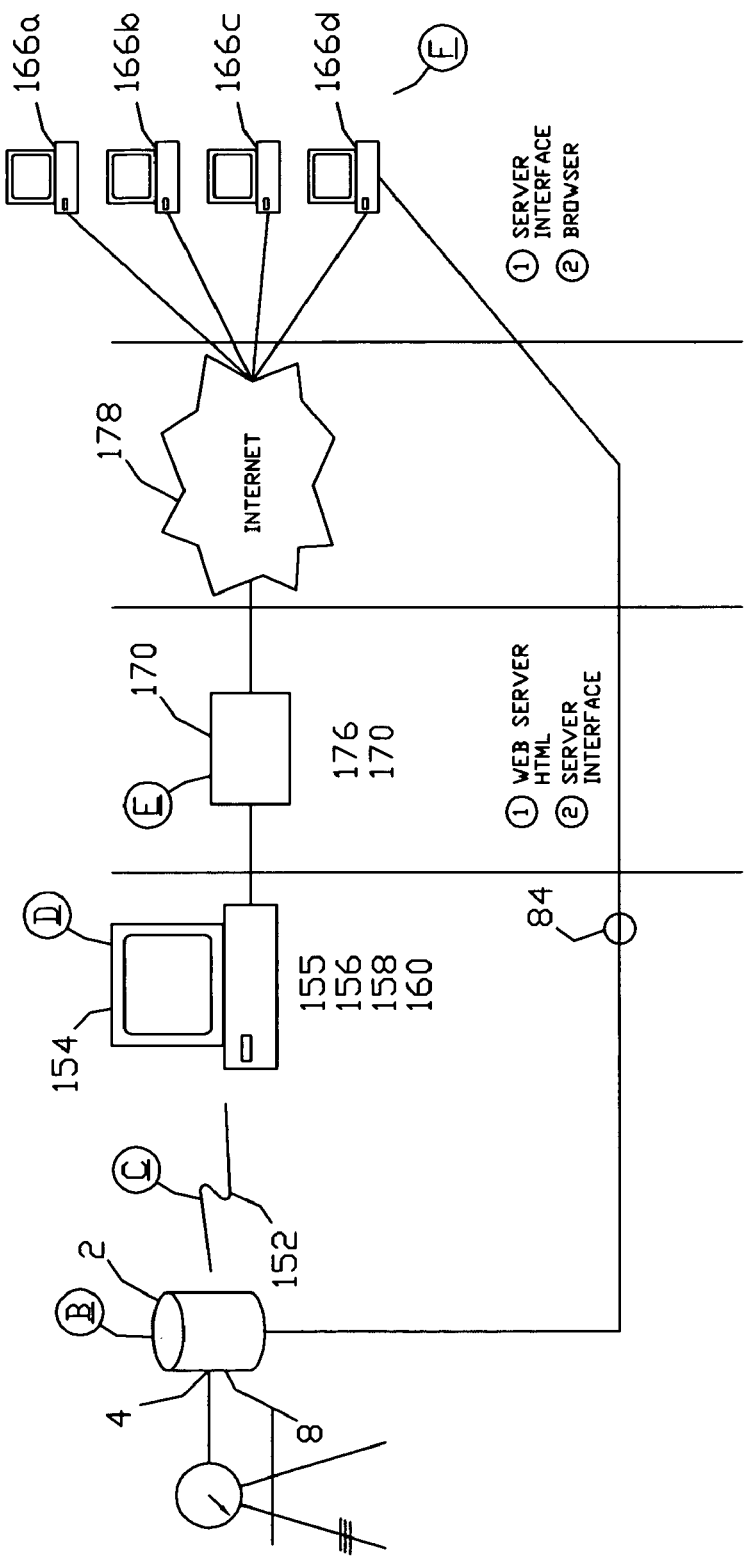
FIG. 5 is a schematic flow chart of a second systems architecture of the present invention.

Referring now to FIG. 5, a schematic flow chart of a second systems architecture of the present invention will now be described. Under this scenario, the pressure from the well 168 will be communicated to the sensor 4 and in turn to the FI 2, which will in turn communicate to the field communication module 20 which in turn is transmitted wirelessly 152 to the data base engine 154. The database engine 154 will have loaded thereon field communication software 155, data manager software 156. The data base 158 will have a table configuration that will enable the storage of the various digital data that has been received. Also included will be a user interface module 160 that consist of software that will interface with the web server 170. A server interface 176 is also included, with the server interface 176 functioning to communicate between the data base engine 154 and a web server 170.

As noted in FIG. 5, there are at least two examples of systems arrangement with this embodiment. First, the server interface 176 may be connected to the Internet 178, which in turn allows the clients 166a, 166b, 166c, 166d, etc. to be connected.

Second, with the teachings of the present invention, it is possible that the field sensors 4, 6 be directly connected to individual clients, such as the client 166d, as denoted by the link 184. This link 184 may be a wireless link, as previously discussed, or may be a phone line, or other conventional means. The operator may wish to have this extra link for security reasons, or to have a back-up system. Regardless of the reason, the architecture allows for this type of arrangement.

FIG. 5 also shows the arrangement for the exception reporting. Thus, the data manager software 156 would allow for the processing of alarm conditions i.e. wherein pressure and/or temperature data exceeds some predetermined level. Thus, there is written into the software a routine that will recognize this exception, and the software will automatically report the exception to the clients 166a, 166b, 166c, and/or 166d as predetermined.

Figure 6:
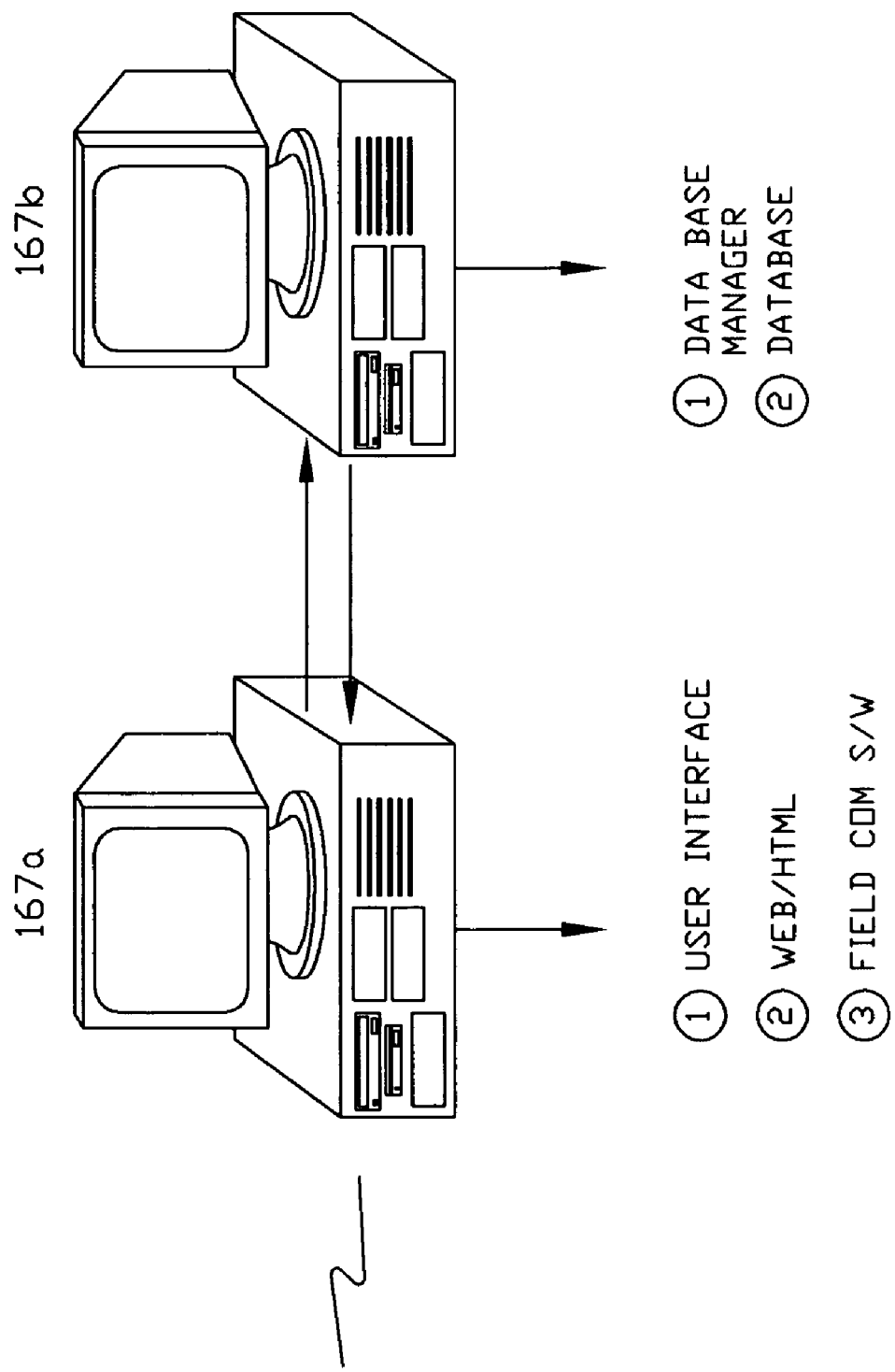
FIG. 6 is schematic diagram of one embodiment of the server arrangement.

FIG. 6 is a schematic diagram of one embodiment of the server arrangement. Thus, a first computer 167a can be used that is electrically connected to a second computer 167b. The computer 167a can have the user interface, hypertext markup language and the field communication loaded thereon. The computer 167b will have the database manager and data base loaded thereon.

Figure 7:
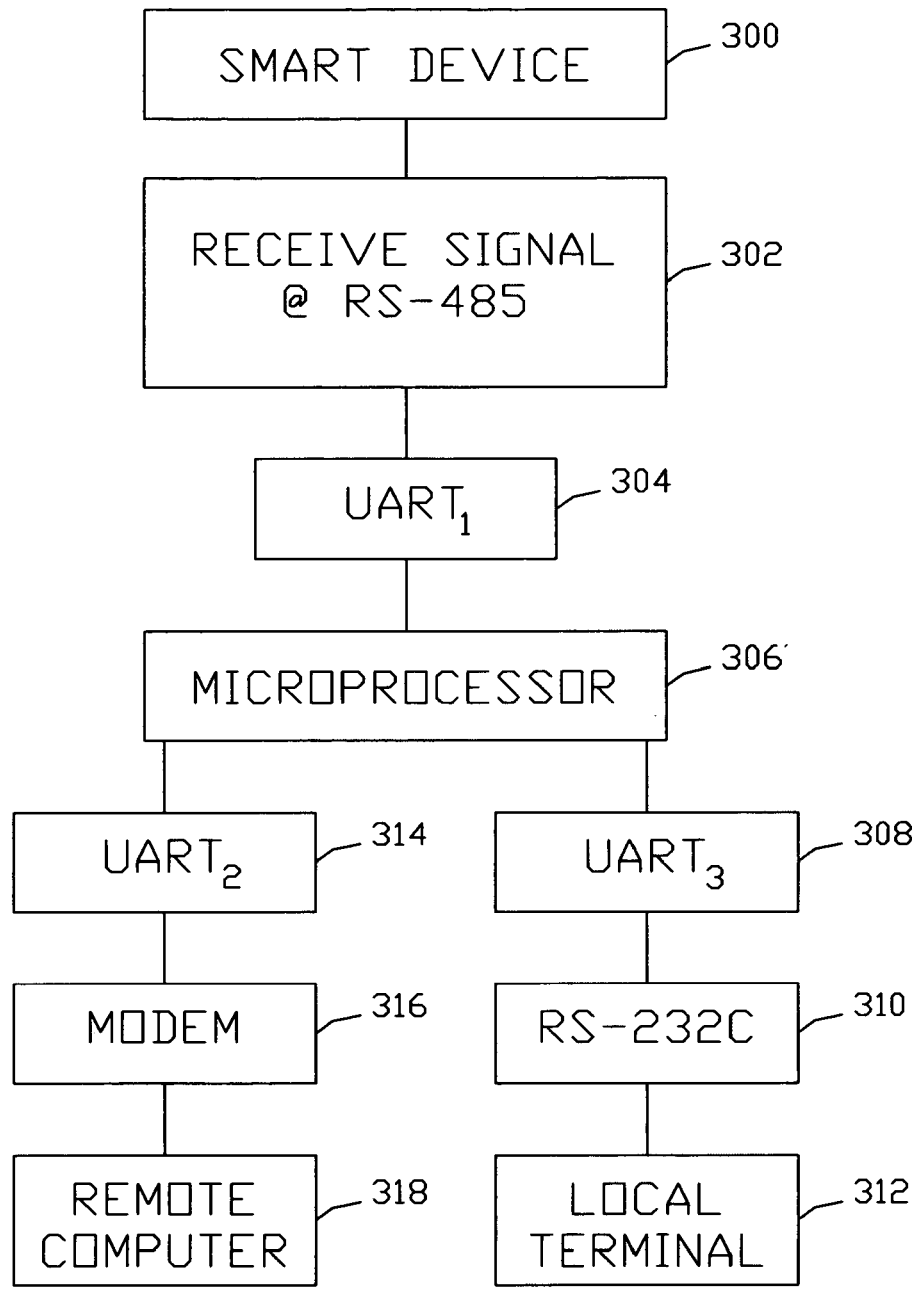
FIG. 7 is a flow chart of the digital signal processing of the present invention.

FIG. 7 is a flow chart of the digital signal processing of the present invention. Thus, the signal from the smart device 300 is received 302 at the RS-485 device 76 which in turn is transmitted to the UART 304. The UART will condition the signal to be accepted by the microprocessor 306. Depending on the mode of operation of the operating system, the microprocessor 306 may then forward the reading to the UART 74 in the step 308 which in turn is sent 310 to the RS-232C 72. The RS 232C 72 allows for a local dump to the local terminal computer 312 where a user can access the collected data on site, for instance.

Alternatively, the mode of operation may dictate that the data be channeled to the UART 314 which in turn will channel the signal to the wireless modem 91, as shown in sequence step 316. The modem will transmit the signal to a remote computer as seen in step 318. From the remote computer, the data may be disseminated via various means such as previously noted with reference to FIGS. 4 and 5.

Figure 8:
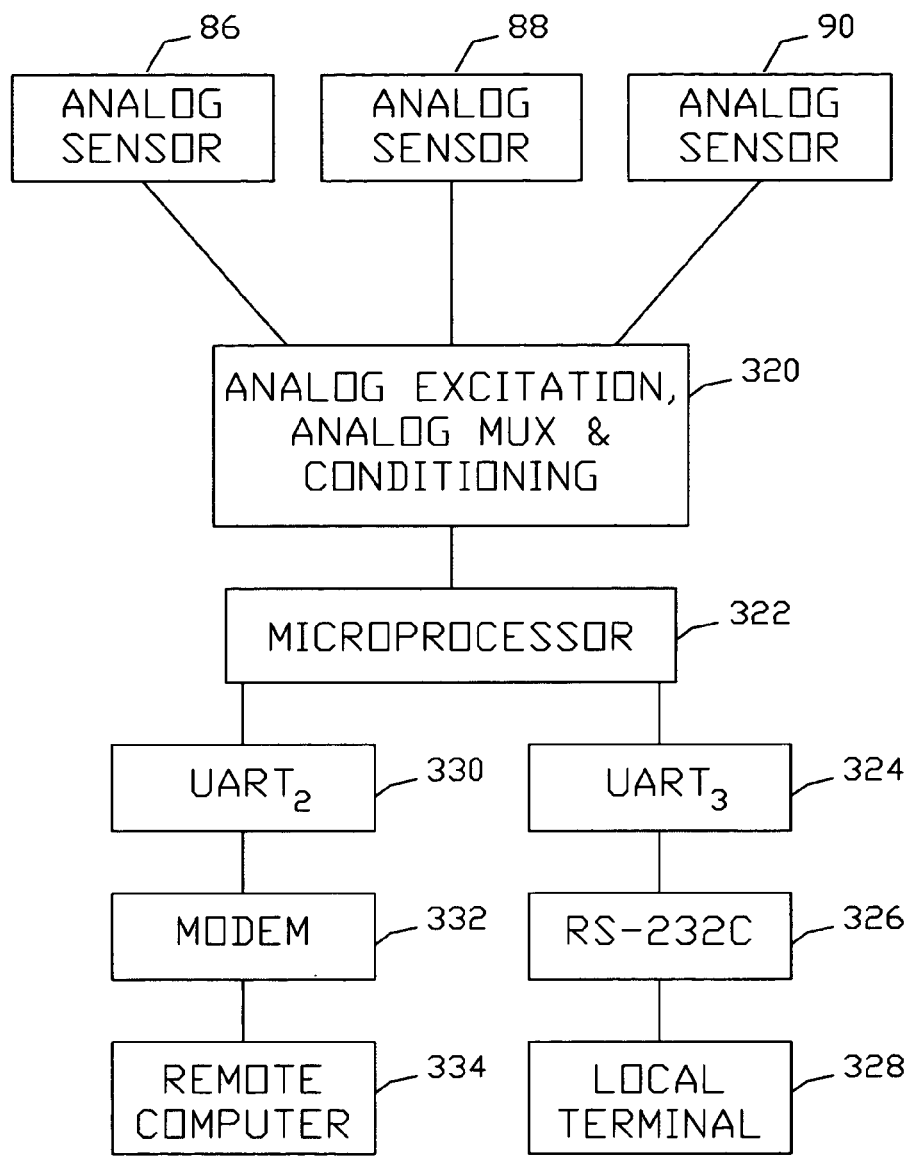
FIG. 8 is a flow chart of the analog signal processing of the present invention.

FIG. 8 is a flow chart of the analog signal processing of the present invention. Thus, the signal from the analog sensor devices 86, 88, 90 are received at the analog excitation conditioning module and analog multiplexer 320 where the analog signal is conditioned and forwarded to the microprocessor in step 322. Depending on the mode of operation of the operating system, the microprocessor may then forward the reading to the UART 74 in the step 324 which in turn is sent 326 to the RS-232C 72. The RS 232C 72 allows for a local dump to the local terminal computer 328 where a user can access the collected data on site, for instance.

Alternatively, the mode of the operating system may dictate that the data be channeled to the UART 330 which in turn will channel the signal to the wireless modem 91, as shown in sequence step 332. The modem will transmitt the signal to a remote computer as seen in step 334. From the remote computer, the data may be disseminated via various means such as previously noted with reference to FIGS. 4 and 5.

Figure 9:
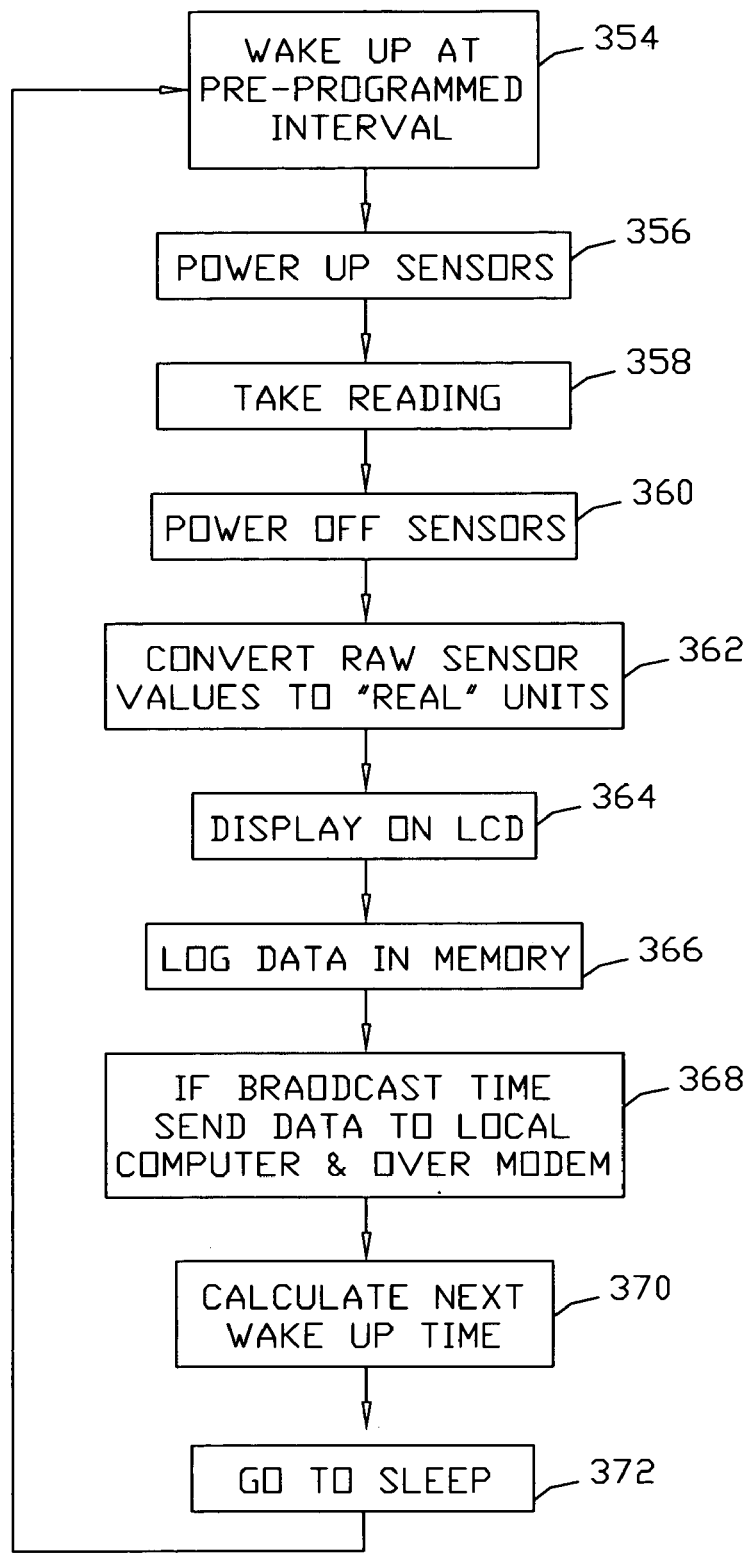
FIG. 9 is a flow chart of the sequence of powering the sensors in order to take readings.

FIG. 9 is a flow chart of the sequence of powering the sensors in order to take readings as well as the sequence of steps of taking a reading. Thus, the operating system generates a wake up signal 354, at a pre programmed time interval, which will cause the sensors to be powered up 356. The sensors will take a reading, as denoted in block 358. The operating system will then cause the sensors to be powered off 360.

Thereafter, the operating system will convert 362 the raw sensor values, stored in the cache memory, to real units utilizing a conversion algorithm as previously stated. The converted readings will then be displayed 364 on the LCD. The converted data is stored into the memory 366. The operating system will determine the next broadcast time point, pursuant to a predetermined time interval; and at the broadcast time, the field instrument (via the communications module) will send the data to a local computer and over the modem 368. The operating system will then calculate the next wake up time 370 and thereafter generate a signal which causes the sensors to power down 372 (referred to as sleep). After the expiration of the predetermined time interval, a wake up signal is generated thus generating the loop back to the step seen in block 354, with the steps being repeated as shown in FIG. 9.

Figure 10:
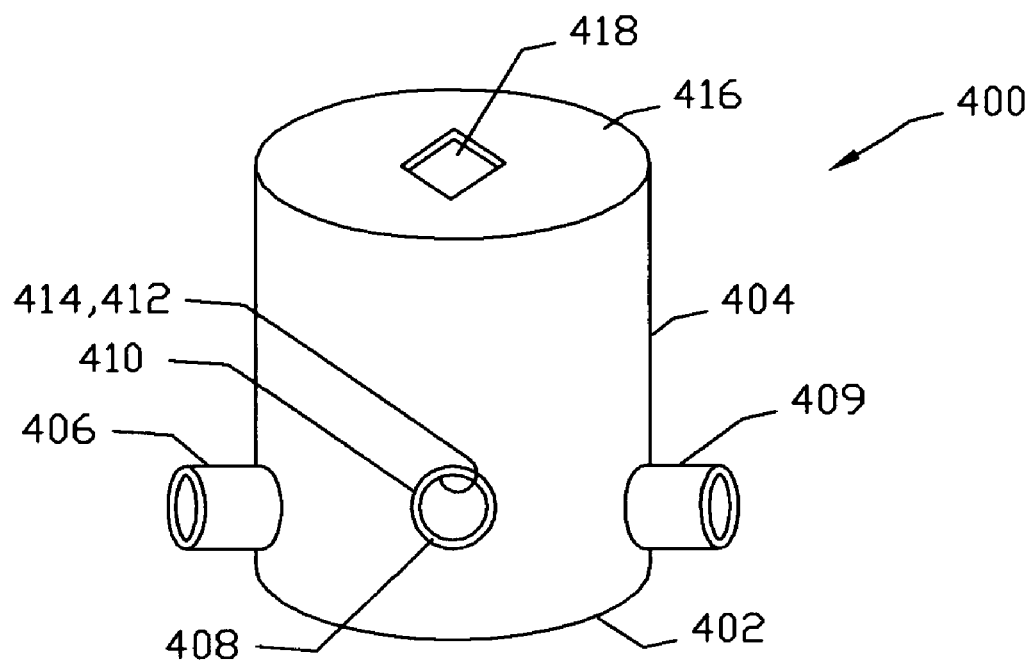
FIG. 10 is a schematic illustration of an enclosure of the present invention.

Referring now to FIG. 10, a schematic illustration of the enclosure 400 of the present invention will now be described. In the preferred embodiment, the enclosure 400 includes a generally cylindrical base 402 that has an outer cylindrical surface 404 that in turn has extending therefrom four projecting openings (only openings 406, 408, 409 are shown in FIG. 7). The openings are generally cylindrical in nature and will have an outer diameter 410 that extends to the inner diameter 412. The inner diameter 412 will have connection means such as an internal thread means 414 that will sealingly engage with an adapter having mating thread means. All four openings will have similar internal thread means. O-rings may be used to aid in sealing. Other connection means include use of pins as well as welding adapters in place. As seen in FIG. 10, the base contains a top 416 with an opening for placement of the LCD 418.

The Liquid Crystal Display (LCD) 418 is also shown, with the LCD being electrically connected to the printed circuit board. The LCD is electrically attached to the digital pressure readout as previously stated. Thus, the operator can view the digital pressure readout utilizing the enclosure 400. The LCD 418 is a custom layout available from Varitronix Ltd.

Therefore, the enclosure 400 is a closed container once the adapters have been placed within the openings. This enclosure 400 represents an explosion proof closed container. As will be understood by those of ordinary skill in the art, hydrocarbons can be hazardous and/or corrosive materials. In accordance with the teachings of the present invention, the pressure from the wells will ultimately be communicated to the sensor within the openings. An important aspect to the invention is to withhold pressure from the inner chamber 229. Additionally, the inner chamber 420 will house the printed circuit boards for the sensor, memory, operating system, modem, battery, etc. Thus, the enclosure must also be capable of withstanding an internal blast. Remember, hydrocarbon fluids and gas are extremely flammable with low flash points.

Figure 11:
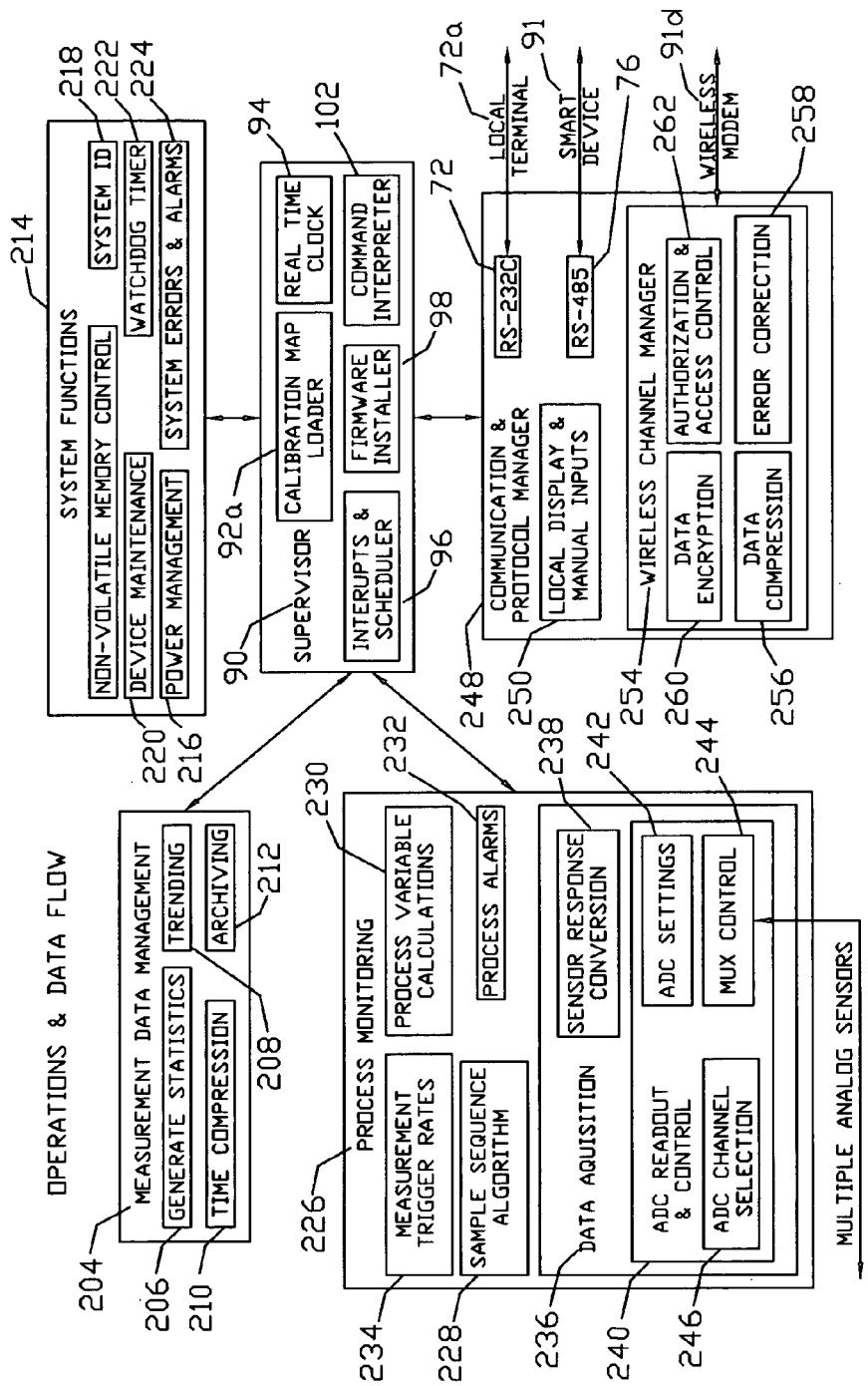
FIG. 11 is an operations and data flow chart of the preferred embodiment

FIG. 11, which is an operations and data flow chart, will now be described. In particular, FIG. 11 depicts the system software & firmware of the operations and data flow. The operating system contains a supervisor means 90 which technically contains the hardware circuit 62 from FIG. 3. The supervisor means 90 also contains additional firmware that includes a calibration map loader means 92a for precision pressure maps, RTD (resistive temperature detector) calibrations, and special purpose calibrations for custom sensors on the external analog input channel (i.e. 4–20 mA conversion). Also included is the real time clock means 94 that will be continuously powered. The real time clock 94 has a programmable delay to the next microprocessor interrupt for data sampling.

The supervisor 90 further contains the interrupts and scheduler 96 for data sampling. The firmware installer 98 contains a boot loader that can be accessed via the local terminal or via the remote communication channel. The command interpreter means 102 is included and contains means for providing the sensor configuration, power management configuration, RTC configuration, UART configuration, memory configuration, display configuration and allows access to raw sensor values, process values and various intermediate calculation results.

The measurement data management module 204 is electrically connected to the supervisor means 90. The measurement data management module 204 includes means 206 for generating process statistics and higher level calculations done on process variable calculation results. The measurement data management module 204 will also contain means 208 for trending, and means 210 for time compression. Some level of statistics and process data can be kept for some period of time including the lifetime of the device. In the preferred embodiment, the oldest data will get compressed the most, while the most recent data is saved at higher resolution (both time and amplitude). Additionally, means 212 for archiving the data is provided.

The supervisor will be operatively connected to the system functions module 214. The system functions module 214 includes the power management means 216 that allows for switched modem power, switched analog circuit power, and in some cases switched external power. Also included will be system identification 218 that will digitally contain information such as serial number, production lot, hardware and firmware revision codes, model number, build date and factory, original configuration, current configuration, first day placed in service and other similar data.

Additionally, a device maintenance means 220 that includes maintenance logs, with the logs containing the last service date, operator and record locator number; last calibration date, calibration source, calibration ID and current calibration status; enclosure access logs that detail when the enclosure has been opened and detect that service was performed, and detect if tampering has occurred. The device management 220 will also update the maintenance history and run-time operating statistics.

The device management 220 has preventative maintenance indicators that include count down clocks, etc. to notify of upcoming preventative maintenance sessions. Additionally, there are checks for battery maintenance/replacement that may indicate when battery charge is low, the batteries are old, or won't recharge properly.

A watchdog timer means 222 has been included. The systems functions module contains a non-volatile memory control that will have a cache memory and EEPROM memory. A system errors and alarms means 224 is included that indicates if the error is recoverable during a current session, or recoverable on the master reset, or recoverable only with physical intervention. Another feature is that the system will have checks and diagnostics activated on start-up, a system for performing self-checks/diagnostics, and a monitor for the status of the RTC (real time clock). Means for monitoring internal analog points is included. These checks are triggered on power up, or manually, or through the local terminal connection, or remotely through the wireless connection. System warnings and error alarms are produced out of the communications ports when a diagnostic fails or receives a suspicious value. The system logs these error/exceptions, and a local error history record is kept in case of outgoing alarms are missed.

Another module of the operations and data flow is the process monitoring module 226. The module 226 includes a sample sequence algorithm 228 which determines when and how to shift between various sample rates, trigger modes, calculations and data analysis. Thus, the process data sampling options include scheduled sampling where process values are determined at a suitable rate on a fixed or sequenced schedule. Typically, this sampling is used when the process values vary slowly or not at all. Also available is adaptive sampling wherein process values are determined at a dynamic rate determined by the recent history of the process. The adaptive sampling is typically used when process values vary erratically.

The process monitoring contains process variable calculation means 230 that allows for AGA 3 or AGA 8 and API "Standard" gas-fluid calculations that provide for material composition correction. The calculation means 230 includes various fluid characteristics, tables, and equations and may contain orifice meter device descriptions (materials, dimensions, specific ID's, etc). Among the process data calculation options are the ability to obtain current values and states for the process and system. Additionally, the history of values and states for the process and system can be obtained. This history can be used to determine process statistics such as the maximum, minimum, average, total, etc. of the parameters thus measured.

Also included in this module is the process alarm means 232 that is based on captured, converted and combined signals from both local and (if installed) remote sensors. The process alarm means 232 may use default or predefined process monitoring algorithms and alarm conditions or user defined algorithms and logic. This module will notify of an alarm condition through the display and will send a message out the RS-232 and wireless ports.

The measurement trigger rates means 234 has single, multiple and/or auto-repeating sequences that may be combined in larger sequences using various process dependent algorithms. Means 234 contains adaptive and conditional sampling methods that include process variable triggered sequences and sampling rate changes. The triggers may be derived from process variables, proportional, rate, derivative, integral and state inputs. The sampling methods include remotely triggered sequences and sampling rates, and allow remote commands to force branches within sequence logic.

Another module is the data acquisition 236 that includes a sensor response conversion 238. For the high precision pressure sensors, an iterative interpolation is used across a pressure-temperature map until convergence. For other simple sensors, an appropriate 1-D conversion may be used to compensate the sensor's transfer function. A ADC readout and control 240 is provided that allows for ADC settings 242 and MUX control 244, that is connected to multiple analog sensors, and ADC channel selection 246.

A communications and protocol manager module 248 is also included that allows the operator to select appropriate data representation and protocol for communication channels. An RS-485 port 76 is included that may be connected to the external smart sensors, or may be connected to other control systems, or may be connected to alarm functions, or may be connected to process monitoring. The RS-232C port 72 is included which allows for a local terminal access to the command interpreter 102. The RS-232C allows for local data retrieval, optional periodic quality control and calibration access, optional firmware update access, sensor configuration, hardwired configuration, local diagnostics and debug access.

A wireless channel management means 254 is included that contains data compression means 256, error correction means 258, data encryption 260 and means for authorization and access control 262. Data encryption is commercially available from several vendors and the data encryption means may use the Data Encryption Standard (DES). Data encryption means 260 is commercially available from RSA Data Security Inc. under the standard RC-4 and RC-2, and both of these are covered under the standard CDPD 1.1, which the wireless modem uses.

Compiled data may be extracted through the local terminal port by a service technician. The data can then be manually carried to data management facility. This data dump mode is used primarily as a back-up if the remote data dump mode is inoperative or unreliable.

As noted earlier, in one of the preferred embodiments, the collected data is communicated through the wireless modem to a remote point. This communication may be initiated either by the instrument via the installed operating system or initiated by a remote user-database server. The data may be routed through a public telephone network, or the Internet or a private communications network to one or more users or databases utilizing TCP/IP. In yet another mode, data is exchanged during an interactive session to provide "real time" readout to either the local terminal or a remote user.

In the alarm mode, process and system status information is sent automatically through one or more of the instrument's communication channels. Data delivery is initiated when a process value calculation or system error determines that an alarm condition exists. Typical examples would be low flow, over pressure, total volume, limits etc.

APPLICATIONS

An application of the novel instrument and system herein disclosed includes flow metering. The instrument samples data at a rate of up to once per second to enable high temporal resolution flow calculations to be performed. The system would be suitable for custody transfer accounting, point-of-use metering, and transmission pipeline leak checking. The instrument normally acts in a remote data dump mode to deliver logged flow data and flow statistics to a user's database via a wireless digital modem. If required, the instrument can switch into alarm mode to signal that a process variable or state is out of specification or it can be periodically interrogated to read process conditions. The location of the instrument would include the wellhead or pipeline monitoring station. Communication means include wireless communication provided either by terrestrial cellular service (digital packet or circuit switched) or digital satellite link. The primary requirements would be for remote, unattended and accurate collection and time stamping of flow rate and total volume data.

Another application would be flow metering using orifice meters. The instrument would require an internal analog P sensor, an internal or external dP sensor (as required by the accuracy needs of the location) and an external RTD temperature sensor. Flow rate or total volume through an orifice meter determined using orifice characteristics and AGA flow equations.

Yet another application would be with a turbine or displacement flow meters. The instrument requires an internal analog P, an external RTD temperature sensor and one or more digital input capture channels to count pulses from the flow meter. Accurate flow rate determination is achieved by using pressure and temperature compensation in conjunction with the digital input count rate.

Still yet another application includes an ultrasonic and multi phase flow meters. The instrument requires an internal analog P, an external RTD temperature sensor and a digital communication port (RS-485) to interface the ultrasonic flow meter. Accurate flow rate determination is achieved by using the pressure and temperature values to determine the Reynolds number of the flow profile past the flow meter, which in turn allows accurate correction of the flow meter readings.

With the teachings of the present invention, the instrument and method can be used for production monitoring and optimization. The instrument samples data about once per minute to monitor production pressure. Instrument acts in a remote data dump mode to deliver logged pressure data and statistics to a user's database. If required, the instrument can automatically switch into alarm mode to signal that a pressure is out of specification or it can be periodically interrogated to read the current pressure. The instrument would be located on or near the wellhead. Communication means includes wireless communication provided either by terrestrial cellular service (digital packet or circuit switched) or digital satellite link. Primary requirements include remote, unattended determination of wellhead pressure. Wellheads would be equipped with an instrument using both a P and RTD sensors. Pressure measurement rate is on the order of minutes to hours, typically time stamped, logged and dumped after many days. Instrument generates an alarm immediately if pressure deviates outside an established performance band.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a review thereof.

We claim:

1. A method of measuring pressure on a hydrocarbon process line, the method comprising:
   providing an enclosure having a first opening and a second opening, and wherein said enclosure contains an inner chamber, and wherein an internal analog pressure sensor is housed in said first opening;
   sealing the first opening and the second opening so that the pressure is precluded from entering or exiting the inner chamber;
   collecting a first analog reading with said internal analog pressure sensor;
   converting the first analog reading to a first digital reading;
   collecting the first digital reading from said internal analog pressure sensor in a control means, located within the enclosure, for receiving, processing, and storing the digital readings, wherein said control means is located within said inner chamber, and wherein the control means has an operating system capable of converting the digital readings to processed values;
   collecting a second analog reading with an external analog pressure sensor, and wherein said external analog pressure sensor is communicated through second opening of said enclosure;
   converting the second analog reading to a second digital reading;
   transmitting the second digital reading to said control means, and wherein said second digital readings are converted to digital processed values;
   transferring the digital processed values in said control means to a modem communications means for wirelessly communicating said digital data at pre-programmed time intervals, wherein said modem communications means is located within said inner chamber;
   converting the digital processed values to a digital packet data in the modem communications means;
   wirelessly transmitting the digital packet data with the modem communications means;
   providing a remote database engine having field communication software to communicate with said modem communications means;
   receiving the digital packet data at said remote database engine;
   providing a web server interface in the database engine;
   linking the database engine to the Internet via the web server interface;
   providing a user computer, said user computer having a web browser;
   communicating to the Internet by the user computer;
   accessing the database engine;
   monitoring the measurements from the user computer;
   sending a signal from the user computer to the database engine, and wherein the signal corresponds to a command to poll said pressure sensor;
   transmitting the signal from the database engine to the modem communication means;
   receiving the signal in the modem communication means;
   collecting an analog temperature reading with an external analog temperature sensor, and wherein said external pressure temperature sensor is communicated through said second opening of said enclosure;
   converting the analog temperature reading to a digital temperature reading;
   transmitting the digital temperature reading to said control means;
   correcting said digital processed values for temperature effect corruption by mapping the digital processed values to a temperature value in an iterative fashion; and,
   back calculating to an adjusted pressure and an adjusted temperature.

2. The method of claim 1 further comprising:
   locally accessing the storage means from a local terminal;
   downloading the digital processed values into the local terminal.

3. A system for transmitting a pressure reading obtained from an oil and gas facility, said oil and gas facility having a pressure, the system comprising:
   an enclosure having a first opening and a second opening, said enclosure forming an internal chamber;
   an external digital sensor means, communicated through said first opening, for producing a representative first digital output reading;
   an internal analog pressure sensor means, sealingly positioned within said second opening, for producing a representative analog pressure output reading;
   means, positioned within said internal chamber and electrically connected to said analog pressure sensor means, for converting the analog pressure output reading into a second digital output reading;
   control means, positioned within said enclosure, for receiving, processing, and storing said first and second digital output readings, and wherein said control means has an operating system capable of converting said first and second digital output readings to processed values;
   means, electrically connected to said receiving and storing means, for locally accessing said first and second digital output processed values;
   means, positioned within said internal chamber, for wirelessly transmitting said first and second digital output processed values at preprogrammed intervals, and wherein said transmitting means further comprises means for authenticating, encrypting and compressing said first and second digital output processed values before said first and second digital output processed values are transmitted;
   database means, operatively associated with said transmitting means, for storing said first and second digital output processed values in a plurality of data tables, said database means including a data manager means for receiving, retrieving and communicating said digital pressure output readings, and field communications software to communicate with said transmitting means;
   a central server, located remotely from said facility, and wherein said central server is capable of receiving said plurality of data tables;
   user interface means, operatively associated with said database means, for allowing access to said plurality of data tables;
   a user computer having means for accessing said user interface means;
   an analog temperature sensor producing an analog temperature signal; an adapter connected to said temperature sensor, said adapter being received within said second opening; and means, electrically connected to said temperature sensor, for converting said analog temperature signal to a third digital signal;

means for correcting said digital processed values for temperature effect corruption by mapping the digital processed values to a temperature value in an iterative fashion;

means for back calculating to an adjusted pressure and an adjusted temperature.

4. The system of claim 3 wherein said transmitting means comprising a communications module means for transmitting said digital output processed values in a TCP/IP protocol.

5. The system of claim 4 further comprising: a user computer, and wherein said user computer has loaded thereon a web browser capable of reading said plurality of data tables and a communications link from said user computer to the Internet.

6. The system of claim 5 further comprising:

alarm means, operatively connected to the receiving and storing means, for generating an alarm condition when an acquired first, second and third digital processed values exceeds a predetermined minimum or maximum digital reading limit and communicating the alarm condition to a local computer and/or external server independent of a polling request from the external server.

7. A process for collecting, transmitting and monitoring a pressure from a facility, the process comprising:

communicating the pressure to a tubular member, wherein the pressure from the facility is communicated to the tubular member;

communicating the pressure from the tubular member to an internal analog pressure sensor;

providing an enclosure having a first port and a second port, and wherein said enclosure contains an inner chamber, and wherein said internal analog pressure sensor is sealingly housed in said first port;

sealing the second port so that the pressure is withheld from the inner chamber so that the pressure is precluded from entering or exiting the inner chamber;

converting the analog pressure reading to a first digital reading;

collecting the first digital reading at a pre-programmed time interval;

collecting a second digital reading at the pre-programmed time interval with an external digital sensor, and wherein said external digital sensor is communicated through said second port of said enclosure;

transmitting the digital readings to a control means for receiving, processing, and storing the digital readings, wherein said control means is located within said inner chamber, and wherein said control means contains an operating system capable of converting the digital readings to processed values;

transferring the digital processed values in said control means to a modem communications means for communicating digital data, wherein said modem communications means is located within said inner chamber;

encrypting the digital processed values with said control means;

converting the encrypted digital processed values to a digital packet data in the modem communications means;

wirelessly transmitting the digital packet data with the modem communications means at the pre-programmed time interval;

receiving the digital packet data at a remote database engine, said database engine having field communication software to communicate with said modem communications means, and wherein said database engine contains a data manager and a central server interface;

storing the digital processed values in a table format;

providing a central server communicated with said database engine via the central server interface;

accessing the central server from a user computer;

requesting the digital processed values from the user computer;

transmitting the digital processed values to the central server;

transmitting the digital processed values to the user computer;

measuring said digital processed values;

setting a predetermined digital processed values minimum limit and maximum limit;

exceeding said predetermined digital processed values minimum or maximum limit;

recording the exceeding of said predetermined digital processed values limit;

producing an exception signal in response to said recording;

sending said exception signal to the database;

transmitting said exception signal to the central server;

transmitting said exception to the user computer;

sending said digital processed values to a web server;

sending said digital processed values to the Internet;

accessing the Internet with a web browser from a user computer;

correcting said digital processed values for temperature effect corruption by mapping the digital processed values to a temperature value in an iterative fashion; and, back calculating to an adjusted pressure and an adjusted temperature.

8. The process of claim 7 wherein the control means has electrically connected thereto serial communication means for transmitting the processed digital processed values, and the process further comprising:

providing a second user computer having a direct link to said serial communication means;

connecting to the control means from the second user computer with the direct link;

transmitting the digital processed values to the second user computer.

9. A system for remotely monitoring an oil and gas facility comprising:

a coupling member capable of receiving a pressure from a tubular member;

an internal analog pressure sensor means for monitoring the pressure contained within said coupling member and generating an analog pressure output reading;

means, electrically connected to said internal analog pressure sensor means, for converting the analog reading to a digital pressure reading;

control means, operatively connected to said pressure sensor means, for receiving, processing, storing and retrieving the digital pressure output reading, and wherein said control means contains an operating system capable of converting the digital readings to processed values;

a field communication module operatively connected to said control means, and wherein said field communication module transmits said digital pressure output processed values at pre-determined intervals and wherein said field communication module is operatively associated with means for encrypting said digital pressure output processed values;

a closed container having an inner chamber and a first port, and wherein said coupling member is sealingly contained within said first port, and wherein said field communication module and said control means is contained within said inner chamber;

a database engine, said database engine having a database receiving said digital pressure output processed values at pre-determined intervals from said field communications module and storing said digital pressure output processed values in a table format, said database engine having field communications software to communicate with said field communications module;

a web server operatively connected to said database engine with a communications link; and wherein said web server contains a TCP/IP protocol for communication with the Internet;

a user computer having a web browser software package, said web browser software package capable of communication with said web server in order to asynchronous transfer data to and from said database engine and said user computer;

a predetermined reading level means, operatively associated with said control means, for detecting when said digital pressure output processed values exceeds a predetermined threshold;

communication means for communicating an exception to said database engine due to the excessive digital pressure output processed values;

an external analog temperature sensor means, electrically communicated to said control means through a second port in said closed container, for monitoring a temperature of the tubular member, said temperature sensor means generating an analog output signal that is converted to a digital temperature output signal.

10. The system of claim 9 further comprising:
temperature correction means, operatively associated with said control means, for correcting the digital pressure output processed values for temperature fluctuations.

11. The system of claim 10 further comprising:
means, operatively associated with said control means, for locally accessing the digital pressure output processed values with a local terminal.

12. A device for communicating pressure information from a facility to a database engine, the device comprising:
a pressure line connected to said facility, said pressure line communicating a pressure from the facility;
an enclosure having an inner chamber, and wherein said enclosure contains a first opening, a second opening, and a third opening therein; a first adapter means, positioned within said first opening, for sealingly receiving said pressure line within said first opening so that said pressure is sealed from said chamber;
an internal analog pressure sensor means, connected to said pressure line and located within said first adapter, for sensing the pressure and generating an analog reading that is converted to a first digital pressure output reading in response to the pressure;
an external digital pressure sensor means, communicated through said second opening, for producing a second digital pressure output reading;
control means, positioned within said chamber, for receiving, storing, processing, and retrieving said digital pressure output readings, and wherein said control means contains an operating system capable of converting the digital readings to processed values;
first serial communication means for communicating said digital pressure output processed values to said control means;
a liquid crystal display readout means, operatively communicated with said control means, for displaying said digital pressure output processed values;
means, operatively connected to said control means, for wirelessly transmitting at pre-determined intervals said digital pressure output processed values stored in said control means to a database engine located remotely from said well facility, and wherein said transmitting means includes an antenna member connected to a second adaptor means for sealingly receiving said antenna member within a third opening in said enclosure and said transmitting means further comprises means for authentication, encrypting and compressing said digital pressure output processed values;
power means, positioned within said chamber, for supplying a power source to said pressure sensor means, said digital serial communication means, said LCD readout, said control means, and said transmitting means;
second serial communication means, electrically connected to said control means for communicating said digital pressure output processed values to a local terminal;
a database means, operatively associated with said database engine, for storing said digital pressure output processed values in a table format, having field communications software to communicate with said field communications module;
a data manager means for retrieving said digital pressure output processed values;
a user computer for accessing said digital pressure output processed values from said data manager means;
an external analog temperature sensor having a third adapter means for sealingly receiving said temperature sensor in said third opening, said temperature sensor producing an analog signal;
converter means operatively connected to said temperature sensor, for converting said analog signal to a digital temperature signal reading;
and wherein said control means further receives and processes, said digital temperature signal reading into processed values.

13. The device of claim 12 further comprising:
error correction means, operatively associated with said control means, for correcting temperature errors in the digital pressure output processed values due to temperature dependency.

14. The device of claim 13 further comprising:
process exceptions means, operatively associated with said control means, for sending an alarm at a predetermined digital pressure reading and communicating an exception of the user computer.

15. The device of claim 14 wherein said transmitting means comprises:
a modem connect able to a hardwired land line telephone network.

16. The device of claim 14 wherein said transmitting means is selected from the group consisting of:
a telephone modem connect able to a circuit switched cellular means;
a terrestrial cellular digital packet data modem means; or,
a digital satellite packet data modem means.

* * * * *